United States Patent
Yeo et al.

(10) Patent No.: US 8,480,049 B2
(45) Date of Patent: Jul. 9, 2013

(54) WALL MOUNTING APPARATUS

(75) Inventors: Jindong Yeo, Pyeongtaek-si (KR);
Kyungwook Kim, Pyeongtaek-si (KR)

(73) Assignee: LG Electronics Inc., Seoul (KR)

( * ) Notice: Subject to any disclaimer, the term of this patent is extended or adjusted under 35 U.S.C. 154(b) by 229 days.

(21) Appl. No.: 12/810,727

(22) PCT Filed: Dec. 10, 2008

(86) PCT No.: PCT/KR2008/007318
§ 371 (c)(1),
(2), (4) Date: Jun. 25, 2010

(87) PCT Pub. No.: WO2009/084825
PCT Pub. Date: Jul. 9, 2009

(65) Prior Publication Data
US 2010/0271798 A1    Oct. 28, 2010

(30) Foreign Application Priority Data
Dec. 28, 2007  (KR) .................. 10-2007-0140921

(51) Int. Cl.
*E04G 3/00* (2006.01)
(52) U.S. Cl.
USPC ............... 248/274.1; 248/288.11; 248/371; 248/923
(58) Field of Classification Search
USPC .......... 248/274.1, 288.11, 371, 398, 917, 248/919, 922, 923; 211/103, 106, 88.01, 211/191, 182, 189
See application file for complete search history.

(56) References Cited

U.S. PATENT DOCUMENTS

| | | | | |
|---|---|---|---|---|
| 4,562,988 A | * | 1/1986 | Bumgardner | 248/181.1 |
| 4,564,166 A | * | 1/1986 | Craft et al. | 248/179.1 |
| 4,621,782 A | * | 11/1986 | Carlson et al. | 248/183.3 |
| 4,880,191 A | * | 11/1989 | Lake, Jr. | 248/371 |
| 5,518,216 A | * | 5/1996 | Wu | 248/371 |
| 7,028,961 B1 | * | 4/2006 | Dittmer et al. | 248/278.1 |
| 7,387,286 B2 | * | 6/2008 | Dittmer et al. | 248/278.1 |
| 2006/0186295 A1 | | 8/2006 | Dittmer et al. | 248/284.1 |
| 2008/0156954 A1 | * | 7/2008 | Yokawa | 248/371 |

FOREIGN PATENT DOCUMENTS

| | | |
|---|---|---|
| GB | 315425 A | 9/1930 |
| KR | 20-1991-0001896 | 1/1991 |
| KR | 20-1992-0002985 | 5/1992 |
| KR | 10-2001-0026202 | 4/2001 |
| KR | 10-2004-0083737 | 10/2004 |
| KR | 10-2004-0083737 A | 10/2004 |
| WO | WO 2007/037565 A1 | 4/2007 |

OTHER PUBLICATIONS

European Search Report dated Sep. 2, 2011 issued in Application No. 08 86 8920.
Chinese Office Action dated Sep. 2, 2011 issued in Application No. 200880122834.2 (with English translation).

* cited by examiner

*Primary Examiner* — Anita M King
(74) *Attorney, Agent, or Firm* — KED & Associates, LLP

(57) ABSTRACT

A wall mounting apparatus is provided. The wall mounting apparatus includes a stationary unit fixed on a wall, a device supporting unit that is movable relative to the stationary unit and supporting a display device, an arc portion that is formed in an arc shape and formed on the device supporting unit, at least one pressing plate that contacts and presses at least one of front and rear surfaces of the arc portion, and a coupling member that presses the arc portion and the pressing plate toward each other.

11 Claims, 2 Drawing Sheets

WALL MOUNTING APPARATUS

TECHNICAL FIELD

The present disclosure relates to a wall mounting apparatus.

BACKGROUND ART

In recent years, flat display devices that are lightweight and slim and can be easily handled have been widely released.

Liquid crystal display panels or a plasma display panels are used for the flat panel display devices. The flat panel display devices do not have any additional thickness except for a thickness of a display module. Therefore, due to theses characteristics of the flat panel displays, the display devices are recently used in a state where they are mounted on a wall. In this case, an interior space occupied by the display device is reduced and thus user convenience can be improved.

In order to mount the display device on the wall, a wall mounting apparatus is required. The wall mounting apparatus includes a variety of adjusting mechanisms for adjusting orientation of the display device in response to a user's location, a frictional mechanism for preventing the display device from drooping by its self-gravity, and a frontward moving mechanism for moving the display device frontward.

In addition, in recent years, customers considering the sense of beauty require a wall mounting device that is not exposed to an external side.

Among the variety of the mechanisms, the frictional mechanism causes dissatisfaction of the user. When the frictional mechanism is not ideally designed, the display device may droop due to its self-gravity. Further, when the frictional force is applied discontinuously, this causes the dissatisfaction of the user.

Needless to say, even when any one of the variety of the mechanisms does not normally operate, the wall mounting apparatus cannot perform its inherent functions.

DISCLOSURE OF INVENTION

Technical Problem

Embodiments provide a wall mounting apparatus that enables a main body of a display device to move in a variety of direction.

Technical Solution

In one embodiment, a wall mounting apparatus includes: a stationary unit fixed on a wall; a device supporting unit that is movable relative to the stationary unit and supporting a display device; an arc portion that is formed in an arc shape and formed on the device supporting unit; at least one pressing plate that contacts and presses at least one of front and rear surfaces of the arc portion; and a coupling member that presses the arc portion and the pressing plate toward each other.

In another embodiment, a wall mounting apparatus includes: a stationary unit fixed on a wall; a device supporting unit that is movable relative to the stationary unit and supporting a display device; an arc portion formed on the device supporting unit and having an arc surface; at least one pressing plate having an arc surface corresponding to the arc portion and presses at least one of front and rear surfaces of the arc portion; and a coupling member that presses the arc portion and the pressing plate toward each other.

In still another embodiment, a wall mounting apparatus includes: a front plate having a rear arc surface; a rear plate disposed behind and on the front plate and having a front arc surface; and an arc portion disposed between the rear arc surface and the front arc surface.

ADVANTAGEOUS EFFECTS

According to the embodiments, there is an advantage in that the display device can smoothly move in an upward-downward direction, a leftward-rightward direction, and a frontward-backward direction.

Further, since an arc plane generating frictional force relative to movement of the display device is large when the display device moves in the upward-downward direction, the movement of the display device can be smoothly realized and the tilting state remains.

MODE FOR THE INVENTION

Reference will now be made in detail to the embodiments of the present disclosure, examples of which are illustrated in the accompanying drawings.

Figure 1:
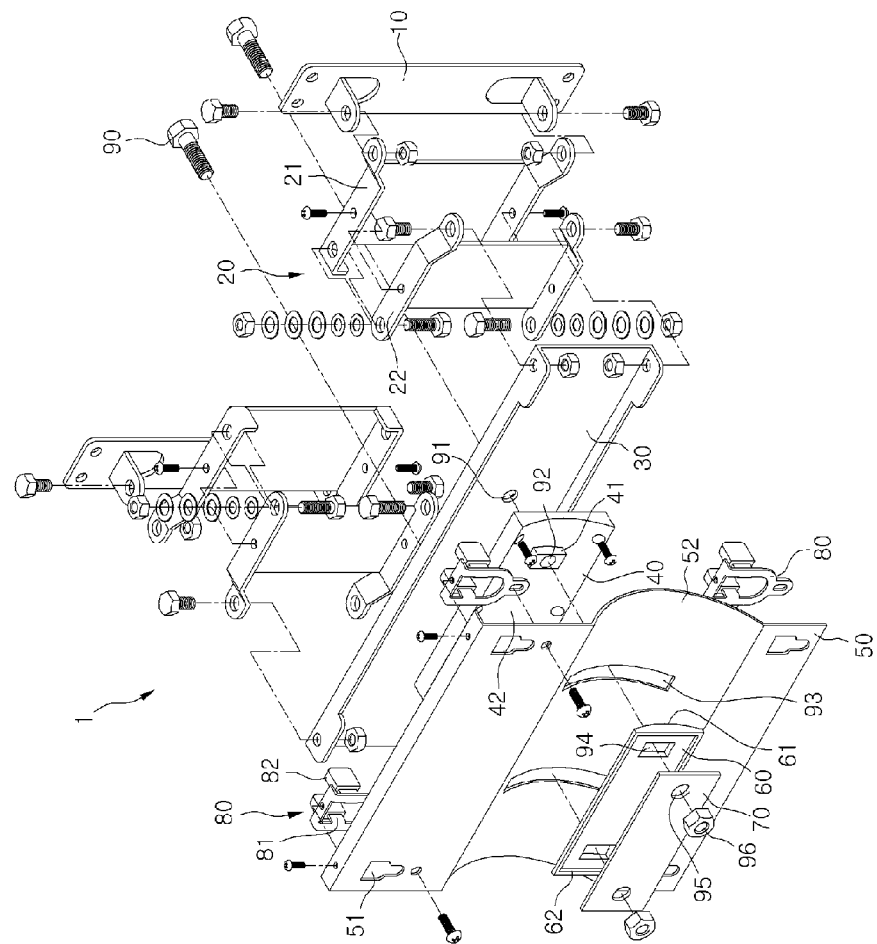
FIG. 1 is an exploded perspective view of a wall mounting apparatus according to an embodiment.

FIG. 1 is an exploded perspective view of a wall mounting apparatus according to an embodiment.

In the following description, when there are constitutional elements that are disposed at left and right sides with reference to the drawings, only one of the constitutional elements will be described and the other is considered as a mirror image having the same structure and operation.

Referring to FIG. 1, a wall mounting apparatus 1 of an embodiment includes stationary units 10 fixed on a wall, a pair of left and right link units 20 that are movable frontward in a state where rear portions thereof are fixed to the stationary units 10, a connecting panel 30 having left and right end portions that are respectively connected to the pair of the link units 20, and a device supporting unit 50 on which a display device is mounted to move together.

In addition, the wall mounting apparatus 1, in order to provide frictional force relative to the movement of the upward-downward direction of the device supporting unit 50, further includes front and rear plates 60 and 40 pressing the device supporting unit 50 at in front and behind the device supporting unit 50, and a tightening unit 70 for coupling the front plate 60, rear plate 40, ad connecting panel 30 to each other.

The operation of the wall mounting apparatus structured as described above will be briefly described.

When it is intended to move the display device frontward, the link units 20 are unfolded in a state where the rear end portions of the link units 20 are fixed to the stationary units 10. Then, the link units 20 that were folded are unfolded and thus the displace device moves away from the stationary units 10. Needless to say, the user moves the display device in a state where he/she grasps the display device.

In addition, when the user intends to rotate in the leftward-rightward direction, one of the link units 20 is moved frontward. Needless to say, in this case, it may be possible to further move one of the link units 20 frontward after both of the link units 20 move frontward to a certain extent. This is for preventing the display device from colliding with the wall.

Furthermore, when the user intends to tilt the display device in the upward-downward direction, the display supporting unit 50 rotates in the upward-downward direction in a state where the front and rear plates 60 and 40 are fixed relative to the connecting panel 30.

Then, the frictional force is generated at connecting surfaces of the device supporting unit 50 to the front and rear plates 60 and 40 and thus resistance against the rotational motion of the device supporting unit 50 is generated. Therefore, when the rotation of the display device is finished, the rotated state remains by the frictional force.

The following will describe a structure of each constitutional element and relations of the adjacent constitutional elements.

First, the stationary units 10 are components that are fixed on the wall. The stationary units 10 are provided with screw holes in which screws are inserted.

Each of the link units 20 includes first and second links 21 and 22.

The first link 21 has an outer portion that is hinged to the stationary unit 10 and an inner portion that is hinged to an inner portion of the second link 22. Therefore, the first and second links 21 and 22 are not easily exposed to the external side even when a predetermined gap is formed between the display device and the wall by the frontward movement of the display device.

Accordingly, when the wall mounting apparatus according to the embodiment is used, the sense of beauty the user feels can be improved. This is because that the connection portion between the first and second links 21 and 22 is disposed at the inner side rather than the outermost side and thus concerns that the first and second links 21 and 22 are viewed by the user are lowered.

The first and second links 21 and 22 are connected to each other by a hinge shape with a washer interposed therebetween. Therefore, when the first and second links 21 and 22 pivot about the hinge shape, the frictional force is generated such that the links 20 are not unfolded unless the user applies predetermined force. The predetermined force may be adjusted by tightening force of the coupling member.

An end portion of the connecting panel 30 is connected to an outer portion of the second link 22. The connecting panel 30 and the second link 22 are also connected to each other by a hinge shaft with a frictional washer interposed therebetween. Therefore, there is a need for a certain amount of the frictional for to move the connecting panel 30 and the second line 22. Further, since the outer portion of the connecting panel 30 is hinged to the outer portion of the second line 22, an effect that a moving distance of the link unit 20 is generally increased when the connecting panel 30 moves frontward. That is, overall lengths of the first and second links 21 and 22 become a withdrawing length of the display device.

The rear plate 40 is fixed to a front portion of the connecting panel 30. A protruding portion 41 is formed on a front surface of the rear plate 40. The rear plate 40 can be securely coupled to the front plate 60 by the protruding portion 41. The protruding portion 41 is provided with a through hole 92 in which the coupling member 90 is inserted. The protruding portion 41 may be inserted into a through hole 94 formed on the front plate 60. Alternatively, a protruding portion may be formed on the front plate 60 and this protruding portion may be inserted into the rear plate 40.

A rear arc surface 42 formed in an arc-shape with reference to an imaginary axis extending in the leftward-rightward direction is formed on a front surface of the rear plate 40. The rear arc surface 42 contacts a rear surface of the device supporting unit 50 to generate the frictional force.

The device supporting unit 50 is disposed in front of the rear plate 40. The device supporting unit 50 is interposed between the front and rear plates 60 and 40 and thus affected by the frictional force when the display device fixed on the device supporting unit 50 moves.

The device supporting unit 50 is provided with a partially cylindrical arc portion 52 with reference to an axis extending in the leftward-rightward direction. The partially cylindrical arc portion 52 protrudes frontward from the device supporting unit 50. That is, the arc portion 52 has an arc surface having a same shape and curvature as the rear arc surface 42.

The front and rear plates 60 and 40 directly contact the arc portion 52 to generate the frictional force. The arc portion 52 is provided with a plurality of slots 93 extending in an upward-downward direction. A rotation range of the device supporting unit 50 is limited by the slots 93.

Extending portions extending upward and downward from the arc portion 52 are further formed. Supporting holes 51 are formed on left and right portions of each of the extending portions. Each of the supporting holes 51 is formed to have an upper portion and a lower portion narrower than the upper portion. Therefore, a head portion of a fixing member such as a bolt fixed on a rear surface of the display device is inserted through the upper portion of the supporting hole 51 and moved downward to be hooked on the lower portion of the seating hole 51. Then, the display device is hooked in the supporting hole 51 and thus is not separated.

Further, stoppers 80 are formed on four corners of a rear surface of the device supporting unit 50. The stoppers 80 define a position where the device supporting unit 50 is closest to the wall. Therefore, when the device supporting unit 50 is pushed rearward to the utmost, the device supporting unit 50 does not directly contact the wall but the stoppers 80 contact the wall. Each of the stoppers 80 includes shock absorbing rubbers 81 and a protruding plate 82 supporting the shock absorbing rubbers 81.

The shock absorbing rubbers 81 may be inserted around the protruding plate 82. Meanwhile, each of the stoppers 80 may be fixed on the device supporting unit 50 by a first screw inserted downward from an above side of the device supporting unit 50 and a second screw inserted rearward from a front side of the device supporting unit 50.

The front plate 60 contacts the front surface of the arc portion 52. To realize this, a front arc surface 61 is formed on a rear surface of the front plate 60 and the front arc surface 61 entirely contacts the front surface of the arc portion 52 to generate the frictional force. In addition, a wall 62 is formed on a front-edge portion of the front plate 60. A tightening plate 70 is disposed on a front surface of the front plate 60 surrounded by the wall 62.

With the above-described structure, the following will describe a structure generating the frictional force during the rotational motion of the display device in the upward-downward direction.

First, corresponding through holes 91, 92, 94, and 95 are respectively formed through the connecting panel 30, rear plate 40, front plate 60, and tightening plate 70. Further, coupling members 90 are inserted into the respective through holes 91, 92, 94, and 95 from a rear side. Nuts 96 are coupled to portions of the coupling member 90, which protrude frontward from the tightening plate 70. By the coupling force of the coupling members 90, the arc surfaces 42 and 62 of the rear and front plates 40 and 60 presses the contact portion of the arc portion 52 of the device supporting unit 50. Further, the tightening force of the coupling members 90 allows the tightening plate 70 to generally press the front plate 60. Therefore, the frictional force between the contact surfaces of the arc portion 52 and the arc surfaces 42 and 61 can be generally generated at the contact surfaces.

Meanwhile, the arc portion 52 is provided with the slots 93 extending in the upward-downward direction and the movable range of the coupling members 90 is limited by the slot 93. That is, when the device supporting unit 50 moves in the upward-downward direction, the slots 93 moves but the coupling members 90 and the protruding portions 41 in which the coupling members 90 are fitted remain at original positions without moving with reference to an overall body of the wall mounting apparatus. Therefore, the movement of the device supporting unit 50 is limited within the range within which the slots 93 move relative to the coupling members 90.

As described above, as the region providing the frictional force against the movement of the display device in the upward-downward direction has a pre-determined area, it can be expected that concerns that the frictional force is irregularly generated within the rotational range of the display device in the upward-downward direction are lowered. That is, since the contact surfaces between the arc surfaces 41 and 61 and the arc portion 52 are enlarged and thus the concentration of the frictional force at one location portion can be prevented.

In other words, frictional coefficients of the contact surfaces may be low and, in this case, the concentration of the frictional force on one location portion can be prevented. In this case, even if there are protrusions and grooves at one location of the contact surface, it can be expected that the frictional force can be generally smoothly generated.

Figure 2:
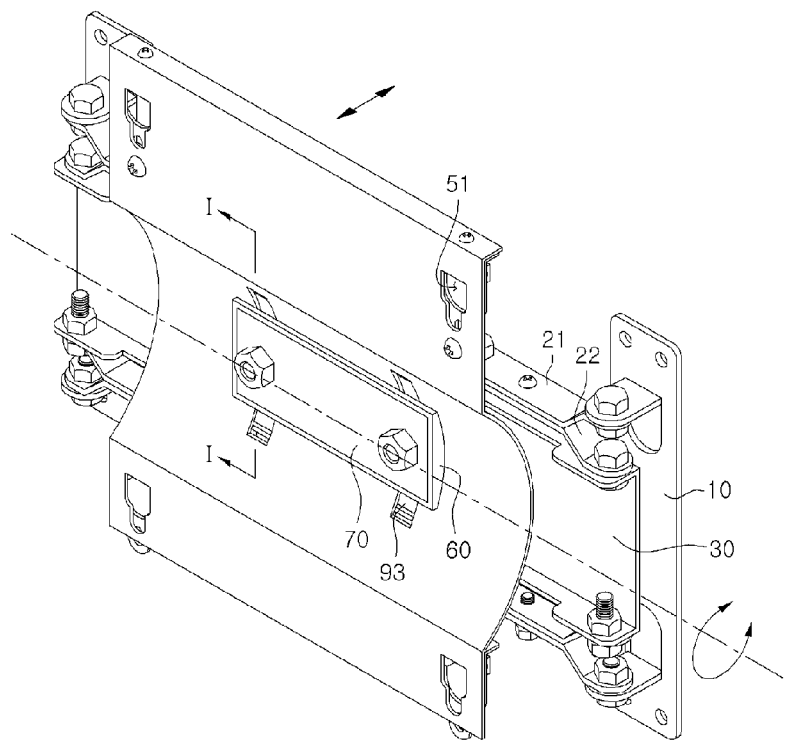
FIG. 2 is a view illustrating an operation of the wall mounting apparatus of the embodiment of FIG. 1.

FIG. 2 is a view illustrating the operation of the embodiment.

FIG. 2 illustrates a state where the wall mounting apparatus is closest to the wall, in which the stoppers 80 contact the wall. Therefore, the display device can be positioned at an accurate location and the damage of the display device, which is caused by the collision of the display device with the wall, can be prevented.

Further, when withdrawing the display device frontward, it can be effectively realized by the unfolding of the link units 20. When the link units 20 move frontward by a predetermined length, the display device can rotate in the leftward-rightward direction by the difference between the lengths of the link units 20 provided at the left and right sides.

In addition, when it is intended to rotate the display device in the upward-downward direction, the device supporting unit 50 rotates in the upward-downward direction relative to the coupling members 90 and the protruding portions 41 that are fixed relative to the wall mounting apparatus. At this point, an effect that a rotational range of the device supporting unit 50, i.e., a limitation of the rotation of the display device in the upward-downward direction is set by the movement of the protrusions 41, through which the coupling members 90 are inserted, within ranges of the slots 93.

Figure 3:
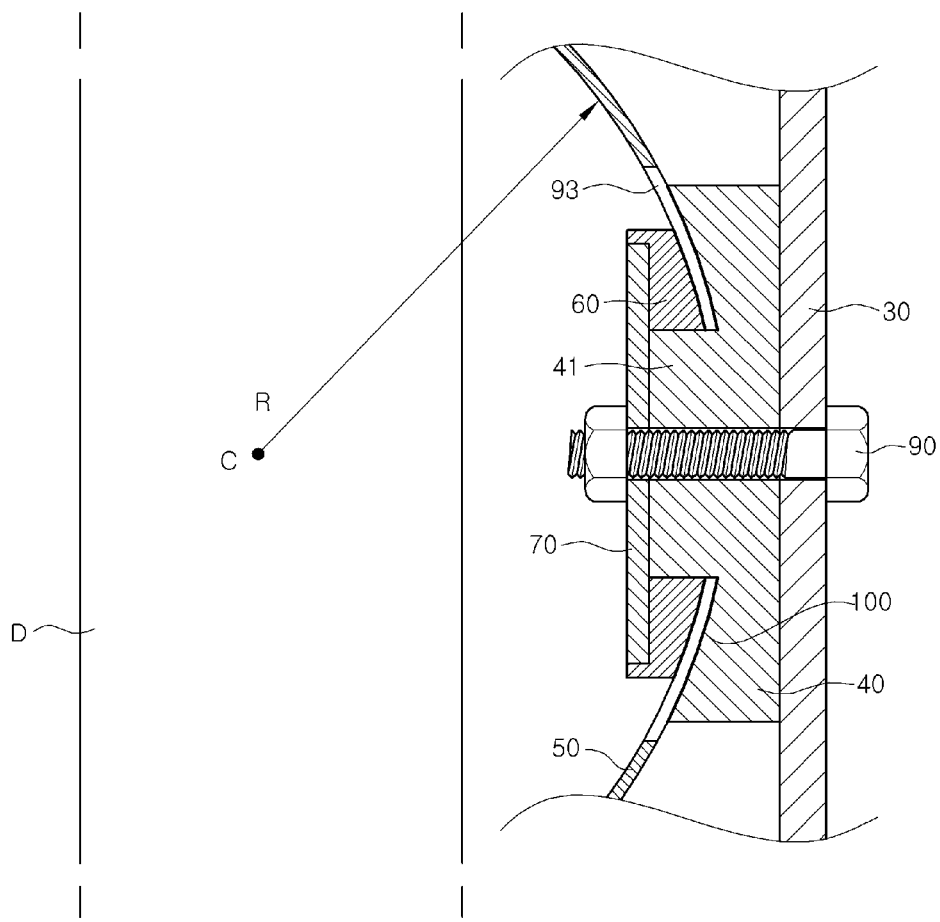
FIG. 3 is a cross-sectional view taken along line I-I.

FIG. 3 is a cross-sectional view taken along line I-I of FIG. 2.

The structure for generating the frictional force in the wall mounting apparatus can be more clearly understood with reference to FIG. 3.

The head portion of the coupling member 90 is hooked on the connecting panel 30 and the tail portion of the coupling member 90 passes through the tightening plate 70 and is coupled to the nut. Then, the tightening plate 70 and the connecting plate 30 are pressed toward each other. The tightening plate 70 and the connecting panel 30 generally presses the front and rear plates 60 and 40. Then, the surfaces where the front and rear plates 60 and 40 contact the device supporting unit 50 function as frictional surfaces 100.

Here, since the tightening plate 70 and the connecting panel 30 press the device supporting unit 50 by pressing the front and rear plates 60 and 40, the frictional surfaces 100 function to entirely generate the frictional force. That is, an area of the frictional surfaces increases and thus an overall amount of the frictional force is not varied even when one location portion of the entire frictional surfaces has an abnormal shape.

Meanwhile, the members contacting inner surfaces of the slots 93 and moving along the slots 93 are the protruding portions 41 rather than the coupling members 90. In addition, a left-right width of the protruding portion 41 may be same as a left-right width of the slot 93. Then, the shaking of the device, which may occur during the rotation of the device supporting unit 50 in the upward-downward direction, can be prevented.

Meanwhile, in a state where the display device D is mounted, a weight center of the display device D, particularly, a weight center C in the frontward-rearward direction coincides with a center of the curvature radius R of the device supporting unit 50. By this structure, no moment by the display device D is applied to the frictional surfaces 100 but only the self-gravity is applied to the frictional surfaces 100.

If not so, the display device D naturally rotates in the upward direction or downward direction.

According to the embodiment, an advantage that the display device can smoothly move in the upward-downward direction, leftward-right direction, and frontward-backward direction can be attained.

In addition, when the display device moves in the upward-downward direction, the movement can be smoothly realized and the tilted state can remain since the arc surface generating the frictional force relative to the movement is enlarged.

The embodiment may further include the following contents. For example, the tightening plate 70 may not be separately provided and, instead, the coupling members 90 may be coupled to the through holes 94. However, in this case, the frictional force may not be properly adjusted and the portion where the frictional force is generated on the front arc surface 61 may be limited to a portion around the through holes 94. Therefore, the frictional force may not be uniformly generated. Therefore, it is more preferable to provide the tightening plate 70.

Further, the link units and the fixing portions are provided in pairs in the embodiment, the present invention is not limited to this configuration. The fixing portions may be formed by a single plate or divided into more than three portions. However, in order to rotate the display device in the leftward-rightward direction, it is preferable that the fixing portions and link units are provided in pairs at left and right.

Furthermore, one of the front and rear plates may be provided not to perform its function. However, in this case, the frictional force is reduced. That is, it is more preferable that the frictional force is generated by the two plates for the stable operation.

In addition, the connecting panel may be omitted and the rear plate may be directly coupled to the outer portion of the second link. In this case, this is not preferable since the frictional force may be locally concentrated on the rear plate. Therefore, the structure of the embodiment is more preferable.

The invention claimed is:

1. A wall mounting apparatus, comprising:
a stationary unit configured to be fixed on a wall;

a device supporting unit that is movable relative to the stationary unit and configured to support a display device, the device supporting unit including an arc portion formed in an arc shape, the arc portion including at least one slot formed therein;

at least one pressing plate that contacts and presses at least one of a rear plate contacting a rear surface of the arc portion;

a front plate contacting a front surface of the arc portion;

a coupling member that presses the arc portion and the front plate toward each other; and a tightening plate positioned in front of the front plate and coupled thereto by the coupling member so as to press the front plate such that an entire surface of the front plate presses the arc portion, wherein a front arc surface is formed on a rear side of the front plate, the front arc surface being shaped to correspond to the arc portion, and a rear arc surface is formed on a front side of the rear plate, the rear arc surface being shaped to correspond to the arc portion, and wherein at least one protruding portion is provided on one of the front plate or the rear plate, and the other of the front plate or the rear plate includes at least one through hole in which the at least protruding portion is inserted.

2. The wall mounting apparatus according to claim 1, further comprising a connecting panel that is provided behind the rear plate and coupled thereto by the coupling member so as to press the rear plate such that an entire surface of the rear plate presses the arc portion.

3. The wall mounting apparatus according to claim 1, further comprising a nut that is coupled to the coupling member passing through the front plate and the arc portion to adjust frictional force.

4. The wall mounting apparatus according to claim 1, wherein the arc portion is formed with reference to an imaginary line extending in a leftward-rightward direction at a location spaced apart frontward from the device supporting unit by a predetermined distance.

5. A wall mounting apparatus, comprising:
a stationary unit configured to be fixed on a wall;
a device supporting unit that is movable relative to the stationary unit and configured to support a display device, the device supporting unit including an arc portion having an arcuate surface and at least one slot;

at least one pressing plate having an arcuate surface corresponding to the arc portion and at least one protruding portion inserted into the at least one slot, wherein the at least one pressing plate presses at least one of a front surface or a rear surface of the arc portion;

a coupling member that presses the arc portion and the at least one pressing plate toward each other;

a connecting panel connected to the rear plate; and a link unit that connects the connecting panel to the stationary unit to adjust a distance between the connecting panel and the stationary unit.

6. The wall mounting apparatus according to claim 5, wherein the coupling member passes through the at least one pressing plate and arc portion in a frontward-rearward direction of the display device.

7. The wall mounting apparatus according to claim 6, wherein the at least one pressing plate comprises:
a rear plate contacting the rear surface of the arc portion; and
a front plate contacting the front surface of the arc portion.

8. The wall mounting apparatus according to claim 7, wherein the at least one protruding portion is provided on one of the front plate or the rear plate, and the other of the front plate or the rear plate includes at least one through hole in which the at least one protruding portion is inserted.

9. A wall mounting apparatus, comprising:
a front plate having a rear arc surface;
a rear plate disposed behind the front plate and having a front arc surface;
an arc portion disposed between the rear arc surface and the front arc surface and having at least one slot formed therein, wherein one of the front plate or the rear plate includes at least one protruding portion inserted in the at least one slot formed in the arc portion; and
a connecting panel that is provided behind the rear plate and coupled thereto by a coupling member so as to press the rear plate such that an entire surface of the rear plate presses the arc portion.

10. The wall mounting apparatus according to claim 9, further comprising a stationary unit supporting the rear plate and configured to be fixed on a wall.

11. The wall mounting apparatus according to claim 9, wherein the coupling member is simultaneously coupled to the front and rear plates and the arc portion.

* * * * *